March 26, 1968     J. G. TSCHINKEL ET AL     3,375,139
FUEL CELL
Filed Nov. 14, 1963
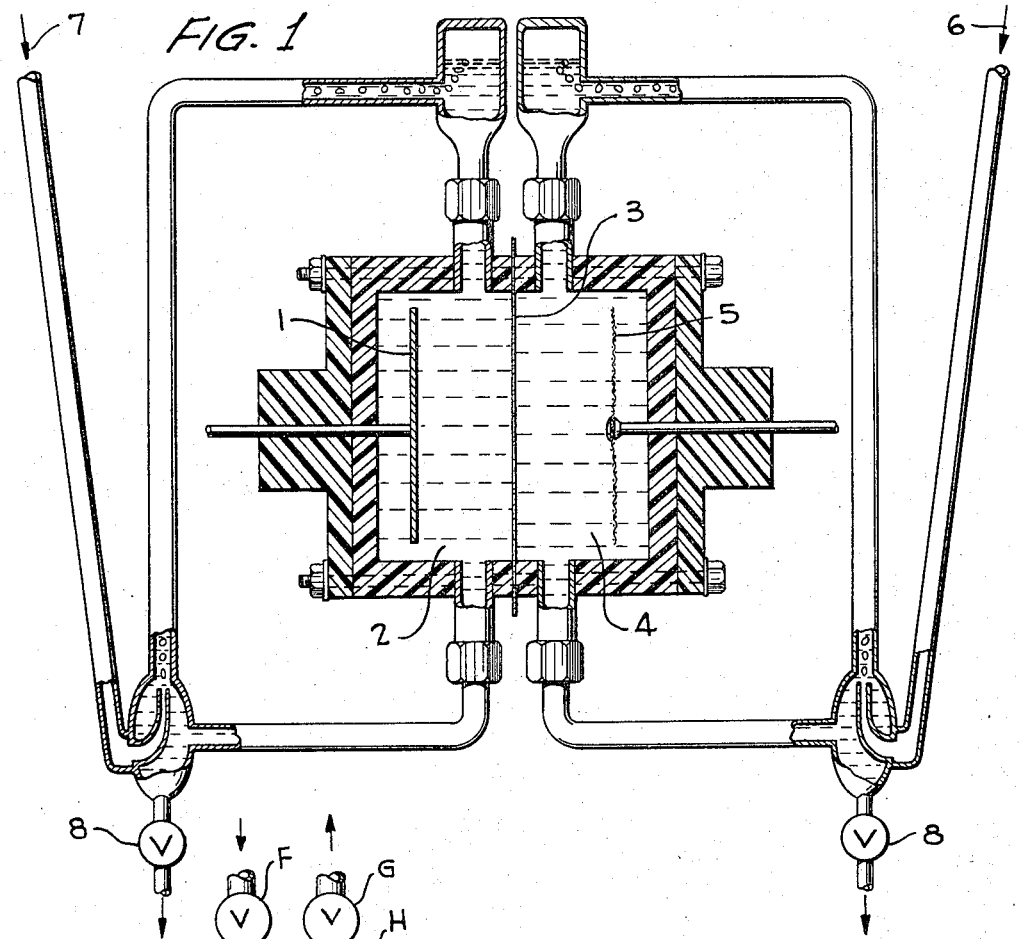
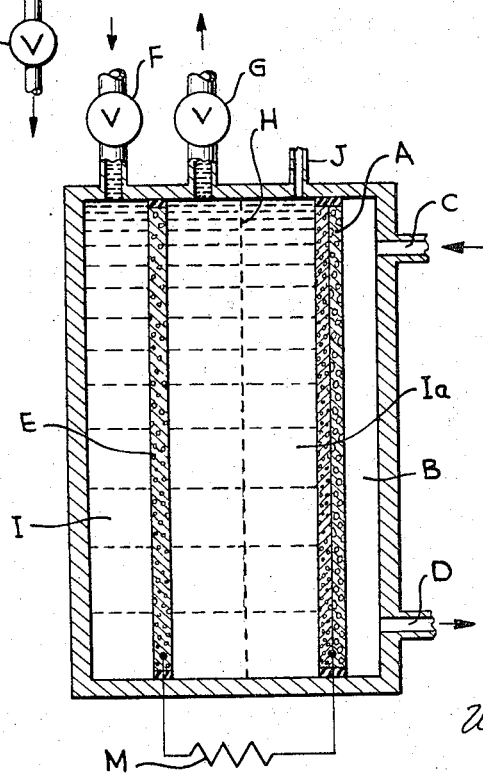
INVENTORS,
JOHANN G. TSCHINKEL
RALPH E. SCHACHAT
HERMAN BERNARD URBACH
BY
Watson, Cole, Grindle & Watson
ATTORNEYS

3,375,139
FUEL CELL
Johann G. Tschinkel, South Glastonbury, Ralph E. Schachat, Bloomfield, and Herman B. Urbach, Windsor, Conn., assignors, by mesne assignments, to Leesona Corporation, Cranston, R.I., a corporation of Massachusetts
Filed Nov. 14, 1963, Ser. No. 323,657
4 Claims. (Cl. 136—86)

This invention relates to an improved fuel cell. More particularly, the invention relates to a fuel cell having an oxygen carrier incorporated in the electrolyte, thereby increasing the rate of diffusion of oxygen through the electrolyte solution to the reactive surface of the electrode.

It is recognized that in a fuel cell employing an oxygen electrode, the current provided by the cell is, in part, limited by the rate of diffusion of oxygen through the electrolytic solution to the surface of the electrode. Therefore, in the construction of a practical cell, this diffusion feature is a critical factor.

In the very early fuel cell art, emphasis was directed to fuel cells employing solid ionic electrolytes. However, more recently, low and medium temperature fuel cells, employing aqueous acid and alkaline materials, have proven to be highly practical. In the process of dissociation, the basic materials produce large numbers of hydroxyl ions which migrate to the fuel electrode where, e.g., adsorbed hydrogen reacts with $OH^-$ ions to form water. Acid electrolytes, on the other hand, permit migration of $H^+$ ions to the oxygen electrode for combination with the oxidant. Other aqueous electrolytes utilize a redox system wherein the electrolyte contains a reagent existing in two valence states. The reagent is incorporated in the electrolyte in the higher state, where it is reduced to the lower state during the operation of the cell. The redox system has serious limitations in that a high energy change occurs, and a very narrow choice of reagents is available, since the redox potential must be close to the potential of the oxygen electrode.

Thus, although aqueous electrolytes have proven to be of practical value in the search for a commercially feasible fuel cell, the diffusion rate of oxygen through aqueous electrolyte solutions, at the operating temperatures of the cells, is limited, controlling to an appreciable extent the current which can be produced by a given cell.

Accordingly, it is an object of the instant invention to provide a fuel cell having an oxygen carrier incorporated in the electrolyte, thereby increasing the solubility of oxygen in the electrolyte and thus, the rate of diffusion of oxygen through the electrolyte to the reactive electrode surface.

It is a further object of the invention to provide a fuel cell which has a high electrical output at low temperatures.

It is still a further object of the instant invention to provide a fuel cell containing a soluble oxygen carrier in the electrolyte, said carrier and electrolyte remaining substantially invariant during the operation of the cell.

These and other objects of the invention will become more apparent from the following detailed description with particular emphasis being placed on the illustrative examples and drawing.

According to the instant invention, a fuel cell is constructed employing an aqueous electrolyte containing an oxygen complexing agent, thereby increasing the rate of supply of oxygen to the reactive electrode surface. The increased supply of oxygen raises the limiting current density of the cell. The complexing agent forms a weak bond with the oxygen, permitting the release of the oxygen with a very low energy change at the electrode surface. The complexing agent must be soluble in the electrolyte and must not poison the catalytic surface of the electrode. Suitable complexing agents include the transition metal complexes. Thus, transition metal complexes of the dioximes such as nickel methyl amyl glyoxime, nickel dimethyl glyoxime, nickel ethyl methyl glyoxime, nickel hydroxy methyl glyoxime, iron dimethyl glyoxime, nickel glyoxaldioxime, and nickel methyl bromo glyoxime, are exceptionally good, as are the phthalocyanine transition metal complexes, and the sulfonates thereof, such as nickel phthalocyanine, sulfonated iron phthalocyanine and copper phthalocyanine. Other operable complexes include nickel histidine, cobalt histidine, iron histidine, iron bisindigo and copper nitrosonaphthol. These comcompounds form weak complexes with oxygen, readily releasing oxygen at the electrode surface of the fuel cell. As is apparent, numerous other compounds can be employed as the oxygen carrier in practicing the instant invention.

The oxygen carriers of the present invention can be employed in aqueous alkaline and acid electrolytes. Thus, it has been found that aqueous alkaline hydroxides, such as sodium hydroxide, lithium hydroxide, potassium hydroxide and mixtures thereof are particularly suitable. Additionally, aqueous carbonates, such as potassium and sodium carbonate, can be employed. Acid electrolytes such as sulfuric and phosphoric acid can be utilized. The oxygen complexing agent is added to the electrolyte in varying amounts, with amounts as low as about 0.10% producing enhanced oxygen transport. The upper amount is not critical, being limited primarily by the solubility of the complexing agent in the electrolyte. However, ordinarily not more than about 8% is employed for economic considerations.

Cells empolying oxygen carrier as proposed by the instant invention can be operated with either air or oxygen as the oxidant. Furthermore, any of the prior art fuels, such as hydrogen, ammonia, carbon monoxide, methanol, methane, and propane, can be employed. The particular fuel employed does not form a part of the instant invention, the proper selection of the fuel being within the ability of one skilled in the art.

The novel fuel cell is particularly advantageous in that it will function satisfactorily at low operating temperatures. Thus, the instant cells will provide satisfactory current densities at temperatures of from about 0° C. to 250° C. However, the cells perform most satisfactorily at temperatures of from about 25–70° C. with the optimum operating temperatures being about 30–35° C. At higher operating temperatures, it is necessary to judiciously select complexing agents which are stable at the operating temperature of the cell.

The electrodes commonly used in the art are suitable for use in the presently described fuel cells. However, substantially non-porous, flat electrodes having a catalyst deposited thereon and porous electrodes impregnated with catalyst are preferred. In the first case, the oxygen saturated electrolyte is circulated over the flat surface, whereas, when porous electrodes are used, the oxygen saturated electrolyte is pumped through the pores of the electrode. As is apparent, more of the surface area of the electrode is utilized in the latter case. Bi-porous electrodes are suited for use with stagnant electrolytes.

Having described the invention in general terms, the following examples will illustrate preferred embodiments of the invention, as well as demonstrate the superiority of the instant fuel cells over identical cells which do not employ an oxygen complexing agent in the electrolyte. The fuel cell used in the examples to set forth the comparative showing is not necessarily a commercially feasible device, but has been constructed primarily to conveniently and accurately demonstrate the superiority of a cell employing an oxygen carrier. The fuel cell used to obtain the data in the examples, illustrated diagrammatically in FIGURE 1 of the drawing, was constructed from lucite with platinized platinum electrodes.

FIGURE 2 is a diagrammatic illustration of a commericially feasible embodiment of a fuel cell.

In FIGURE 1, the platinum anode is suspended in an aqueous alkaline anolyte 2. A semipermeable membrane 3 of parchment was used to separate the anolyte from the catholyte 4. A platinum screen cathode 5 was suspended by suitable means in an aqueous alkaline catholyte. The electrodes are approximately ½ inch apart. Oxygen was fed into the catholyte through oxygen inlet 6 and hydrogen was fed into the anolyte through hydrogen inlet 7. Valve 8 can be activated to drain the system. No attempt was made in the instant cell to develop a high current density. Thus, porous electrodes were not used. The apparatus employed, as noted hereinbefore, was designed to permit an analytical evaluation of the difference between an electrolyte without an oxygen carrier and an electrolyte employing an oxygen complexing agent.

EXAMPLE 1

(A) A fuel cell substantially as illustrated in FIGURE 1 was employed, the anolyte and catholyte being three normal potassium hydroxide. No carrier was employed. The rest potential of the cell was 0.89 volt. When a current of 0.5 ma./cm.$^2$ was drawn from the cell, the cell potential dropped to 0.70 volt.

(B) 1% nickel dimethyl glyoxime was added to the catholyte of a system identical to the one employed in Part A above. The rest potential of the cell was 0.90 volt. A current of approximately 2.0 ma./cm.$^2$ was drawn from the cell before the potential dropped to 0.70 volt. The operating temperature of the cells in both parts A and B was room temperature (25–26° C.).

As is apparent, the performance of the cell employing an oxygen complex agent in the electrolyte was improved in performance by a factor of 4.

EXAMPLE 2

(A) A five normal potassium hydroxide anolyte and catholyte were added to a fuel cell substantially identical to the one depicted in FIGURE 1. The rest potential of the cell was 1.05 volt. When a current of 0.65 ma./cm.$^2$ was drawn from the cell, the potential dropped to 0.77 volt.

(B) 0.47% nickel methyl ethyl glyoxime was added to the catholyte of a fuel cell system identical to that of part A above. The rest potential of the cell was 1.05 volts. A current of 3.0 ma./cm.$^2$ could be drawn before the cell voltage dropped to 0.77 volt. The operating temperature of the cell in both A and B above was room temperature (25–26° C.).

As is apparent, the performance of the cell containing an oxygen carrier in the catholyte was greater by a factor of 4.

EXAMPLE 3

(A) A fuel cell substantially as depicted in FIGURE 1 employing five normal potassium hydroxide solution as the anolyte and catholyte had a rest potential of 1.05 volts. When a current of 0.65 ma./cm.$^2$ was drawn, the voltage dropped to 0.77 volt.

(B) 0.38% nickel hydroxymethyl glyoxime was added to the catholyte of the fuel cell system employed in part A. The cell had a rest potential of 1.03. When a current of 2.4 ma./cm.$^2$ was drawn, the cell voltage was reduced to 0.77 volt.

(C) 0.81% nickel hydroxymethyl glyoxime was added to the catholyte of the fuel system disclosed in part A. The cell had a rest potential of 1.03 volts. When a current of 4.9 ma./cm.$^2$ was drawn, the cell voltage was reduced to 0.77 volt.

As is apparent, the incorporation of approximately .40% oxygen complexing agent gave an improved cell performance by a factor of approximately 4. When the nickel hydroxymethyl glyoxime was increased to approximately .80%, an improved factor of approximately 7 was obtained.

In the above examples the oxygen complexing agent can be replaced by other materials, including nickel methyl amyl glyoxime, histidine complexes of nickel, cobalt, and iron, iron bisindigo, nickel phthalocyanine, iron phthalocyanine (sulfonated), copper nitrosonaphthol, iron dimethyl glyoxime, copper phthalocyanine, nickel oxaldihydroxamic acid, nickel glyoxaldioxime, and nickel methyl bromo glyoxime.

In the above examples the cellophane membrane separating the anolyte from the catholyte can be replaced by other semipermeable materials including parchment, semiporous polymers, such as polyethylene, polyvinyl chloride, polymethacrylate, and polystyrene. Other membranes can be used including the ion exchange resin membranes. Furthermore, it is not completely necessary to employ a porous barrier between the anode and cathode. In most systems, however, a diaphragm is preferred.

While the fuel cell depicted in FIGURE 1 is not necessarily practical, a commercially feasible hydrogen-oxygen cell illustrating the invention is shown diagrammatically in FIGURE 2. Anode A is a bi-porous nickel-nickel oxide electrode coated with platinum black catalyst. Hydrogen is passed into fuel compartment B through inlet C with impurities being vented through outlet D. The oxidizing electrode E is a flat, homoporous metal plate. Electrolyte I comprising a 28% aqueous potassium hydroxide solution containing 0.80% nickel dimethyl glyoxime, saturated with oxygen, is pumped into the fuel cell through inlet F where it flows through cathode E, and removed through outlet G. Ion permeable membrane H, prevents oxygen saturated electrolyte I from contacting anode A. Electrolyte Ia in contact with anode A is also 28% aqueous potassium hydroxide, but does not contain oxygen carrier and is not saturated with oxygen. Element J serves as a vent. Current is removed from the cell through external circuit M. The cell when operated at 65° C. exhibits excellent electrochemical characteristics.

While various modifications of this invention are described, it should be appreciated that the invention is not restricted thereto, but that other embodiments will be apparent to one skilled in the art which fall within the scope and spirit of the invention and appended claims.

In the aforesaid disclosure and in the appended claims, "transition metals" are the transition metals of the generally-known Mendelyeev's Periodic Table.

It is claimed:

1. A fuel cell for the direct generation of electricity from a fuel and oxidant comprising a fuel electrode, an oxygen electrode, and a substantially invariant electrolyte in contact with each of said electrodes, said electrolyte consisting essentially of an aqueous solution of an alkaline hydroxide having from 0.10 to 8 percent of an oxygen complexing agent selected from the group consisting of nickel dimethyl glyoxime; nickel methyl ethyl glyoxime; nickel hydroxymethyl glyoxime; nickel methyl amyl glyoxime; nickel histidine; cobalt histidine; iron histidine; iron bisindigo; nickel phthalocyanine; iron phthalocyanine; copper nitrosonaphthol; iron dimethyl glyoxime; copper phthalocyanine; nickel oxaldihydroxamic acid; nickel glyoxaldioxime; and nickel methyl bromo glyoxime.

2. The fuel cell of claim 1 wherein an ion permeable diaphragm is positioned between the fuel and oxidant electrodes, whereby the oxygenated electrolyte is restrained from contacting the fuel electrode.

3. A fuel cell for the direct generation of electricity from a fuel and oxidant comprising a fuel electrode, an oxygen electrode, and a substantially invariant electrolyte in contact with each of said electrodes, said electrolyte consisting essentially of an aqueous solution of an alkaline hydroxide having from 0.10 to 8 percent of an oxygen complexing agent selected from the group consisting of nickel dimethyl glyoxime; nickel methyl ethyl glyoxime; and nickel hydroxymethyl glyoxime.

4. The fuel cell of claim 3 wherein an ion permeable diaphragm is positioned between the fuel and oxidant electrodes, whereby the oxygenated electrolyte is restrained from contacting the fuel electrode.

References Cited

UNITED STATES PATENTS

| 2,993,946 | 7/1961 | Lozier | 136—100 |
| 3,000,996 | 9/1961 | Usel | 136—9 |
| 3,095,331 | 6/1963 | Davis | 136—154 |

OTHER REFERENCES

Stein, Status Report on Fuel Cells, SRO Report No. 1, June 1959.

ALLEN B. CURTIS, *Primary Examiner.*

WINSTON A. DOUGLAS, *Examiner.*

H. FEELEY, *Assistant Examiner.*